United States Patent
Narayanasamy et al.

(10) Patent No.: US 11,618,455 B2
(45) Date of Patent: Apr. 4, 2023

(54) DRIVING DATA USED TO IMPROVE INFRASTRUCTURE

(71) Applicant: Toyota Motor North America, Inc., Plano, TX (US)

(72) Inventors: Narendran Narayanasamy, Irvine, CA (US); Tangie Tolbert, Murphy, TX (US)

(73) Assignee: Toyota Motor North America, Inc., Plano, TX (US)

( * ) Notice: Subject to any disclaimer, the term of this patent is extended or adjusted under 35 U.S.C. 154(b) by 349 days.

(21) Appl. No.: 16/529,603

(22) Filed: Aug. 1, 2019

(65) Prior Publication Data
US 2021/0031780 A1 Feb. 4, 2021

(51) Int. Cl.
*B60W 40/09* (2012.01)
*G06F 8/65* (2018.01)
*H04W 4/44* (2018.01)
*G07C 5/00* (2006.01)
*G08G 1/0967* (2006.01)
*G05D 1/00* (2006.01)

(52) U.S. Cl.
CPC ........... *B60W 40/09* (2013.01); *G05D 1/0061* (2013.01); *G05D 1/0088* (2013.01); *G06F 8/65* (2013.01); *G07C 5/008* (2013.01); *G08G 1/096708* (2013.01); *G08G 1/096783* (2013.01); *H04W 4/44* (2018.02); *G05D 2201/0213* (2013.01)

(58) Field of Classification Search
CPC ...... B60W 40/09; H04W 4/44; G05D 1/0061; G05D 1/0088; G05D 2201/0213; G06F 8/65; G07C 5/008; G08G 1/096708; G08G 1/096783

USPC .......................................................... 701/23
See application file for complete search history.

(56) References Cited

U.S. PATENT DOCUMENTS

| | | |
|---|---|---|
| 7,421,334 B2 | 9/2008 | Dahlgren et al. |
| 9,365,213 B2 | 6/2016 | Stenneth et al. |
| 9,475,500 B2 | 10/2016 | Grimm et al. |
| 9,786,154 B1 * | 10/2017 | Potter ............... G06Q 40/08 |
| 9,809,158 B2 | 11/2017 | Geller |
| 9,816,827 B1 | 11/2017 | Slusar |
| 10,126,742 B2 | 11/2018 | Ross et al. |

(Continued)

FOREIGN PATENT DOCUMENTS

WO WO 2016/086057 6/2016

*Primary Examiner* — Mahmoud S Ismail
(74) *Attorney, Agent, or Firm* — Snell & Wilmer LLP (57) ABSTRACT

A system for improving transportation infrastructure includes a network access device to receive vehicle behavior data from multiple vehicles, the vehicle behavior data corresponding to at least one of driver-controlled vehicle behavior or autonomous vehicle behavior and including at least one of vehicle locations associated with the vehicle behavior data or infrastructure data indicating features of infrastructure associated with the vehicle behavior data. The system further includes a memory to store the vehicle behavior data including the at least one of the vehicle locations or the infrastructure data. The system further includes a processor to perform an analysis of the vehicle behavior data and the at least one of the vehicle locations or the infrastructure data and to identify an improvement to the transportation infrastructure to at least one of reduce traffic, increase driver comfort, or increase safety based on the analysis.

20 Claims, 4 Drawing Sheets

(56) References Cited

U.S. PATENT DOCUMENTS

| | | | |
|---|---|---|---|
| 10,202,177 B1 | 2/2019 | Hartman et al. | |
| 10,210,677 B2 | 2/2019 | Walker et al. | |
| 10,486,708 B1 * | 11/2019 | Chan | B60W 60/001 |
| 10,839,621 B1 * | 11/2020 | Tiwari | G07C 5/008 |
| 2007/0216521 A1 | 9/2007 | Guensler et al. | |
| 2016/0133131 A1 * | 5/2016 | Grimm | G08G 1/096725 |
| | | | 701/117 |
| 2017/0038774 A1 * | 2/2017 | Ebina | G05D 1/0061 |
| 2017/0356751 A1 | 12/2017 | Iagnemma | |
| 2018/0025317 A1 | 1/2018 | Dominguez | |
| 2019/0051173 A1 | 2/2019 | Kang | |
| 2019/0094865 A1 * | 3/2019 | Fletcher | B60W 30/00 |
| 2019/0108749 A1 | 4/2019 | Gaither | |
| 2020/0039534 A1 * | 2/2020 | Dipietro | B60W 50/087 |

* cited by examiner

DRIVING DATA USED TO IMPROVE INFRASTRUCTURE

BACKGROUND

1. Field

The present disclosure relates to systems and methods for utilizing big data from vehicles to drive future improvements to transportation infrastructure, or to drive new design of transportation infrastructure.

2. Description of the Related Art

City planners and civil engineers design new transportation infrastructure and develop improvements to existing infrastructure. The infrastructure may include, for example, roads, bridges, tunnels, or the like. These planners have a relatively limited set of data to use in determining which types of infrastructure work best in specific situations. For example, some planners may receive complaints from drivers or residents indicating that they believe a particular intersection is unsafe, but this information is subjective and not hard data. Additionally, some municipalities collect and save accident data corresponding to accidents at specific locations. Again, however, this data is incomplete because some accidents may never be recorded, some incorrect facts may be recorded (e.g., an officer writes down one driver's statement as accurate even though it is not), etc.

Even though some of this data may be available for city planners and civil engineers, it has further shortfalls. First off, the available data is very limited and thus only paints a relatively small portion of the big picture. Additionally, no data exists that indicate where inefficiencies exist on public streets. Also, no data exists for close calls (e.g., situations in which accidents almost occurred) or other types of information.

Thus, there is a need in the art for systems and methods for using data detected by vehicles to determine improvements to transportation infrastructure.

SUMMARY

Described herein is a system for improving transportation infrastructure. The system includes a network access device designed to receive vehicle behavior data from multiple vehicles, the vehicle behavior data corresponding to at least one of driver-controlled vehicle behavior or autonomous vehicle behavior and including at least one of vehicle locations associated with the vehicle behavior data or infrastructure data indicating features of infrastructure associated with the vehicle behavior data. The system further includes a memory designed to store the vehicle behavior data including the at least one of the vehicle locations or the infrastructure data. The system further includes a processor coupled to the network access device and the memory and designed to perform an analysis of the vehicle behavior data and the at least one of the vehicle locations or the infrastructure data and to identify an improvement to the transportation infrastructure to at least one of reduce traffic, increase driver comfort, or increase safety based on the analysis.

Also disclosed is a method for improving transportation infrastructure. The method includes receiving, by a network access device, vehicle behavior data from multiple vehicles, the vehicle behavior data corresponding to at least one of driver-controlled vehicle behavior or autonomous vehicle behavior and including at least one of vehicle locations associated with the vehicle behavior data or infrastructure data indicating features of infrastructure associated with the vehicle behavior data. The method further includes storing, in a memory, the vehicle behavior data including the at least one of the vehicle locations or the infrastructure data. The method further includes performing, by a processor, an analysis of the vehicle behavior data and the at least one of the vehicle locations or the infrastructure data. The method further includes identifying, by the processor, an improvement to the transportation infrastructure to at least one of reduce traffic, increase driver comfort, or increase safety based on the analysis.

Also disclosed is a method for improving transportation infrastructure for autonomous vehicles. The method includes receiving, by a network access device, autonomous vehicle behavior data from multiple vehicles, the autonomous vehicle behavior data including at least one of vehicle locations associated with the autonomous vehicle behavior data or infrastructure data indicating features of infrastructure associated with the autonomous vehicle behavior data, the autonomous vehicle behavior data including at least one of an autonomous vehicle initiating a handoff from autonomous control to driver control or a driver initiating the handoff from the autonomous control to the driver control, or autonomous confidence data corresponding to a confidence level of an autonomously-controlled action as determined by an electronic control unit (ECU) of one of the multiple vehicles. The method further includes storing, in a memory, the autonomous vehicle behavior data including the at least one of the vehicle locations or the infrastructure data. The method further includes performing, by a processor, an analysis of the autonomous vehicle behavior data and the at least one of the vehicle locations or the infrastructure data. The method further includes identifying, by the processor, an improvement to at least one of the transportation infrastructure or at least one of the multiple vehicles to at least one of reduce traffic, increase driver comfort, or increase safety based on the analysis.

BRIEF DESCRIPTION OF THE DRAWINGS

Other systems, methods, features, and advantages of the present invention will be or will become apparent to one of ordinary skill in the art upon examination of the following figures and detailed description. It is intended that all such additional systems, methods, features, and advantages be included within this description, be within the scope of the present invention, and be protected by the accompanying claims. Component parts shown in the drawings are not necessarily to scale, and may be exaggerated to better illustrate the important features of the present invention. In the drawings, like reference numerals designate like parts throughout the different views, wherein:

DETAILED DESCRIPTION

The present disclosure describes systems and methods for using big data from vehicles to determine improvements to transportation infrastructure or to determine improved infrastructure design for use in new regions. These systems provide benefits and advantages such as collecting big data from vehicles to improve infrastructure. The infrastructure improvements provide benefits and advantages such as reducing traffic, increasing driver comfort, and increasing safety. Using big data from vehicles provides the benefit of learning how vehicles react to specific types of infrastructure, providing higher-quality data with which to make infrastructure decisions. Additionally, use of data from multiple vehicles give a greater quantity, and higher accuracy, of data used in infrastructure planning. Because the data is received from multiple types of vehicles, the system can advantageously determine improvements to infrastructure which can optimize the infrastructure for multiple types of vehicles. The information learned from the system can advantageously be used to improve existing infrastructure and can be included in future city design, resulting in relatively optimized city infrastructure. The system can also advantageously determine optimal types of infrastructure on its own, providing benefits such as reducing staffing expenses for cities and removing human error from infrastructure design decisions.

An exemplary system includes a network access device that can receive vehicle behavior data from multiple vehicles. The vehicle behavior data may correspond to operation or control of the vehicle in various locations and situations, and may include the vehicle behavior along with corresponding locations or types of infrastructure. The system may further include a memory that can store a map of a specific location, along with types of infrastructure at various locations on the map. The memory may further store the received vehicle behavior data. The system may also include a processor that can analyze the vehicle behavior data at the corresponding locations or infrastructure, and can identify improvements to the infrastructure.

Figure 1:
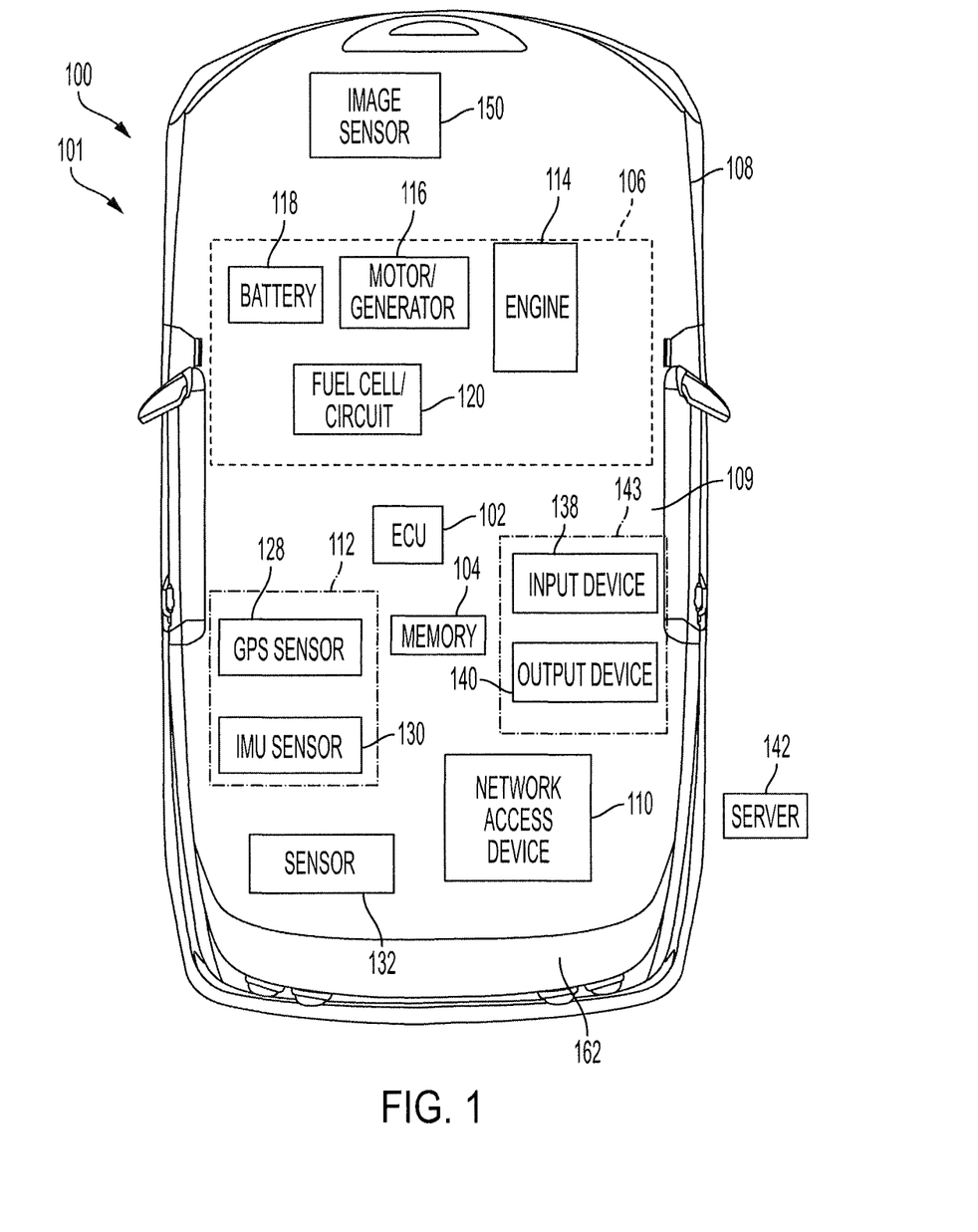
FIG. 1 is a block diagram illustrating a system and a vehicle for identifying improvements to transportation infrastructure according to an embodiment of the present invention.

Turning to FIG. 1, a vehicle 100 may be part of a system 101 for identifying improvements to vehicle infrastructure based on data collected by the vehicle 100 and other vehicles. The vehicle 100 (or system 101) may include an ECU 102, a memory 104, a power source 106, and a main body 108. The vehicle 100 (or system 101) may further include a network access device 110, an image sensor 150, and a sensor 132. The vehicle may also include a multimedia unit 143 including an input device 138 and an output device 140.

The main body 108 may be propelled along a roadway, may be suspended in or on water, or may fly through air. The main body 108 may resemble a vehicle such as a car, a bus, a motorcycle, a boat, an aircraft, or the like. The main body 108 may further support one or more individual such as a driver, a passenger, or the like. The main body 108 may define a vehicle cabin 109.

The ECU 102 may be coupled to each of the components of the vehicle 100 and may include one or more processors or controllers, which may be specifically designed for automotive systems. The functions of the ECU 102 may be implemented in a single ECU or in multiple ECUs. The ECU 102 may receive data from components of the vehicle 100, may make determinations based on the received data, and may control the operations of the components based on the determinations.

The vehicle 100 may be non-autonomous, fully autonomous, or semi-autonomous. In that regard, the ECU 102 may control various aspects of the vehicle 100 (such as steering, braking, accelerating, or the like) to maneuver the vehicle 100 from a starting location to a destination. In some embodiments, the vehicle 100 may be operated in an autonomous, semi-autonomous, or fully driver-operated state. In that regard, the vehicle 100 may be operated independently of driver control and, from time to time, without a person inside of the vehicle 100. The ECU 102 may facilitate such autonomous functionality.

The memory 104 may include any non-transitory memory and may store data usable by the ECU 102. For example, the memory 104 may store map data, may store data received from vehicles (such as detected by the image sensor 150 or the sensor 132), may store instructions usable by the ECU 102 to drive autonomously, or the like.

The power source 106 may include any one or more of an engine 114, a motor-generator 116, a battery 118, or a fuel-cell circuit 120. The engine 114 may convert a fuel into mechanical power for propelling the vehicle 100. In that regard, the engine 114 may be a gasoline engine, a diesel engine, an ethanol engine, or the like.

The battery 118 may store electrical energy. In some embodiments, the battery 118 may include any one or more energy storage device including a battery, a flywheel, a super capacitor, a thermal storage device, or the like.

The fuel-cell circuit 120 may include a plurality of fuel cells that facilitate a chemical reaction to generate electrical energy. For example, the fuel cells may receive hydrogen and oxygen, facilitate a reaction between the hydrogen and the oxygen, and output electricity in response to the reaction. In that regard, the electrical energy generated by the fuel-cell circuit 120 may be stored in the battery 118 and/or used by the motor-generator 116. In some embodiments, the vehicle 100 may include multiple fuel-cell circuits including the fuel-cell circuit 120.

The motor-generator 116 may convert the electrical energy stored in the battery 118 (or electrical energy received directly from the fuel-cell circuit 120) into mechanical power usable to propel the vehicle 100. The motor-generator 116 may further convert mechanical power received from the engine 114 or from wheels of the vehicle 100 into electricity, which may be stored in the battery 118 as energy and/or used by other components of the vehicle 100. In some embodiments, the motor-generator 116 may include a motor without a generator portion and, in some embodiments, a separate generator may be provided.

The location sensor 112 may include any sensor capable of detecting data corresponding to a current location of the vehicle 100. For example, the location sensor 112 may include one or more of a global positioning system (GPS) sensor 128, an inertial measurement unit (IMU) sensor 130, or the like. The GPS sensor 128 may detect data corresponding to a location of the vehicle. For example, the GPS sensor 128 may detect global positioning coordinates of the vehicle 100. The IMU sensor 130 may include one or more of an accelerometer, a gyroscope, or the like. The IMU sensor 130 may detect inertial measurement data corresponding to a position, a velocity, an orientation, an acceleration, or the like of the vehicle 100. The inertial measurement data may be used to identify a change in location of the vehicle 100, which the ECU 102 may track in order to determine a current location of the vehicle 100.

The image sensor 150 may include any one or more sensor capable of detecting image data. For example, the image sensor 150 may include a camera capable of detecting light in the human-visible spectrum, infrared light, ultraviolet light, or light having any frequency. The image sensor 150 may also or instead include a radar detector, a LIDAR detector, or the like. The radar/LIDAR sensor may be capable of detecting objects in the vicinity of the vehicle 100, which may be analyzed or converted to another form for analysis. The image sensor 150 may be located at any position on the vehicle 100 and may be oriented in any direction. For example, the image sensor 150 may include a camera oriented to detect data in front of the vehicle, two cameras each oriented to detect data on the sides of the vehicle, and a radar sensor oriented to detect radar data in front of the vehicle.

The sensor 132 may include one or more of the location sensor 112, a sensor capable of detecting a status of a vehicle component, a sensor capable of detecting a collision, or the like. The sensor 132 may also or instead include a brake sensor to detect an amount of braking, an acceleration sensor configured to detect acceleration of the vehicle 100, a turning sensor configured to detect a turning radius of the vehicle 100, or the like. As additional examples, the sensor 132 may include one or more of a grade sensor designed to detect a grade of a current roadway, an altimeter designed to detect an altitude of the vehicle 100, a speed sensor (such as an angular velocity sensor coupled to one or more wheel) designed to detect a speed of the vehicle 100, or the like. The sensor 132 may also or instead include one or more of a voltage sensor, a current sensor, a temperature sensor, a pressure sensor, a fuel gauge, an airflow sensor, an oxygen sensor, or the like.

The network access device 110 may include any network access device capable of communicating via a wireless protocol. For example, the network access device 110 may communicate via Bluetooth, Wi-Fi, a cellular protocol, vehicle to vehicle (V2V) communications, Zigbee, or any other wired or wireless protocol. The network access device 110 may be referred to as a data communication module (DCM) and may communicate with any device on the vehicle 100 and/or any remote device.

The network access device 110 may communicate with a remote server 142 (such as a cloud server or other central server). The remote server 142 may receive vehicle behavior data from the vehicle 100. The vehicle behavior data may include, for example, braking actions of a driver, acceleration actions of the driver, turning data, autonomous control of an autonomous vehicle, or the like. The remote server 142 may aggregate and analyze the vehicle behavior data to identify improvements to transportation infrastructure based on the analysis of the vehicle behavior data.

The input device 138 may include any one or more input device such as a button, a keyboard, a mouse, a touchscreen, a microphone, or the like. The input device 138 may receive input from a user of the vehicle 100 such as a driver or a passenger.

The output device 140 may include any output device such as a speaker, a display, a touchscreen, or the like. The output device 140 may output data to a user of the vehicle such as a determined route from a starting location to a destination.

Figure 2:
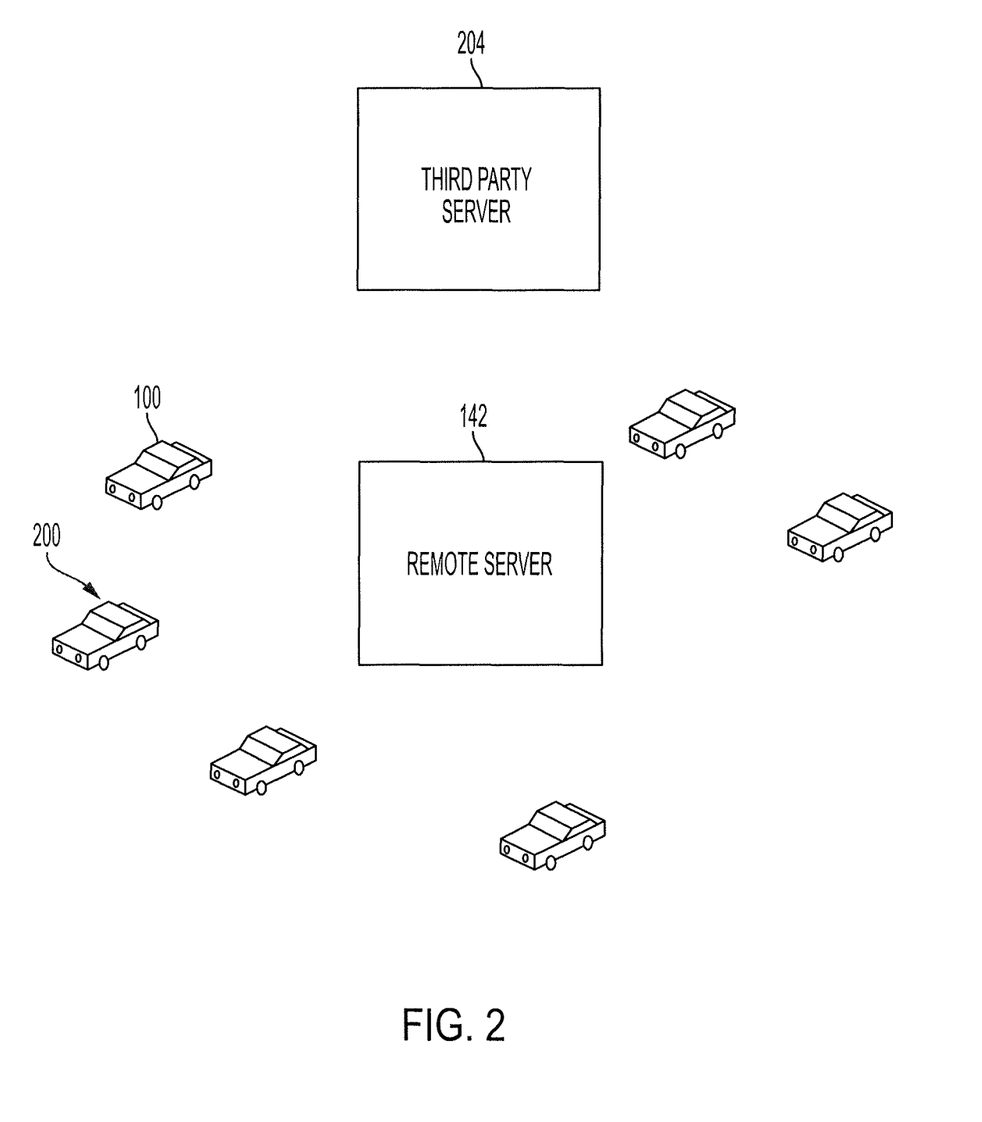
FIG. 2 is a block diagram illustrating a system for identifying improvements to transportation infrastructure according to an embodiment of the present invention.

Referring now to FIG. 2, the remote server 142 may communicate with multiple vehicles 200 including the vehicle 100. The remote server 142 may receive vehicle behavior data from some or all of the vehicles 200. The remote server 142 may aggregate and analyze the vehicle behavior data in order to determine an improvement to transportation infrastructure such as adjusting a lane width, a quantity of lanes, adding or removing a roundabout, or the like.

The remote server 142 may also determine software updates to autonomous or non-autonomous vehicles. For example, the analysis of the vehicle behavior data may indicate that autonomous vehicles relinquish control of the vehicles to a driver when the vehicle reaches a specific stoplight. The remote server 142 may determine a software update to increase vehicle confidence at the stoplight and may transmit the software update to associated vehicles.

The remote server 142 may further communicate with a third-party server 204. The third-party server 204 may provide public information data such as a list of transportation infrastructure and their corresponding locations. The remote server 142 may receive this public information data and may use the public information data to aid in the infrastructure improvement determinations.

The third-party server 204 may also operate as an infrastructure design system. In that regard, a user of the third-party server 204 may plan infrastructure improvements (or may design infrastructure for specific locations). In that regard, the remote server 142 may transmit an analysis of vehicle behavior data (which may indicate improvements to infrastructure or new and improved infrastructure design features) to the third-party server 204. A user of the third-party server 204 may receive the analysis, improvements, or new design features and may provide a recommendation as to whether to implement the new features.

Figure 3:
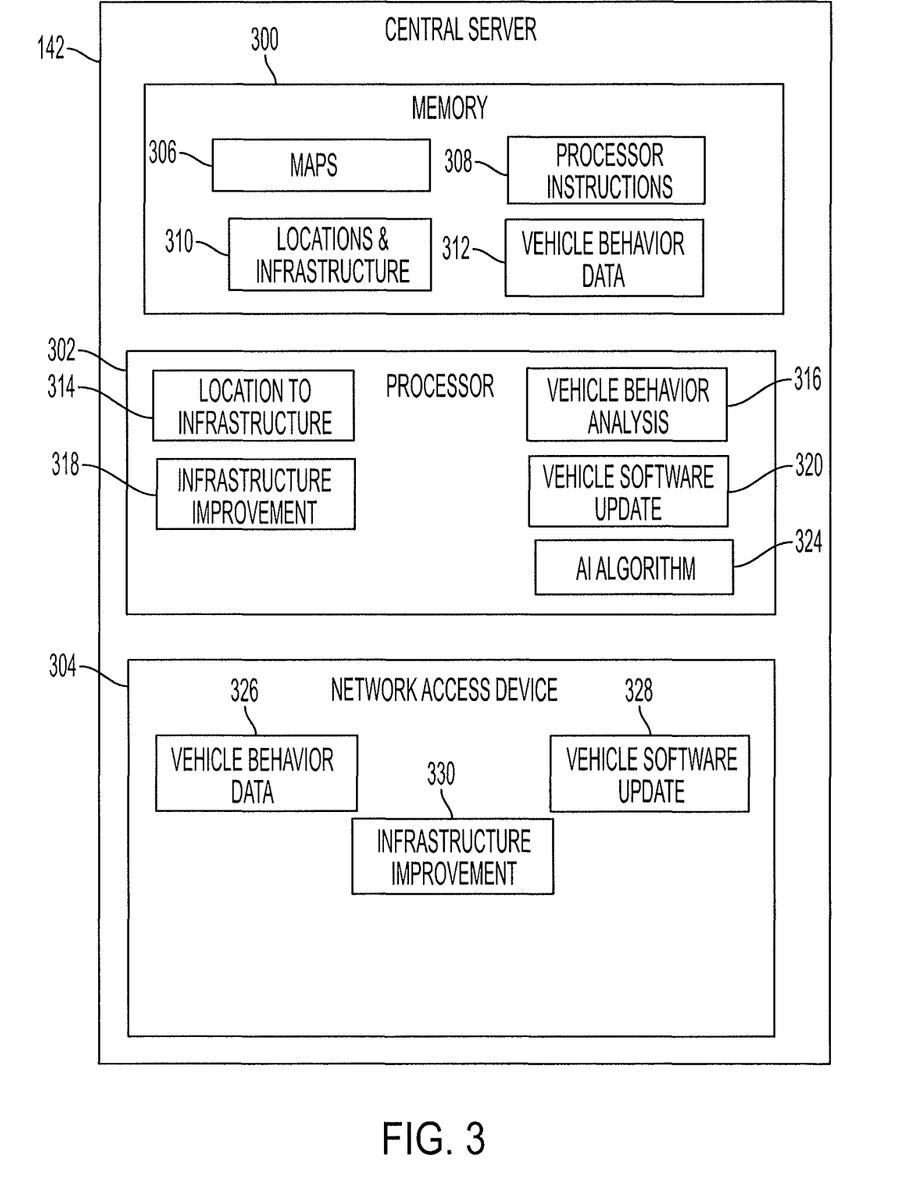
FIG. 3 is a block diagram illustrating features of a server of the system of FIG. 2 according to an embodiment of the present invention.

Referring now to FIG. 3, additional details of the remote server 142 are shown. As shown, the remote server 142 includes a non-transitory memory 300, a processor 302, and a network access device 304. The memory may include any non-transitory memory capable of storing data. The processor 302 may include any controller, processor, or other discrete logic device capable of performing logic functions. In some embodiments, the processor 302 may be an artificial intelligence processor capable of performing artificial intelligence algorithms. The network access device 304 may include any network access device capable of communicating with remote devices (such as one or more of the vehicles 200 of FIG. 2). For example, the network access device 304 may communicate via Bluetooth, Wi-Fi, a cellular protocol, vehicle to vehicle (V2V) communications, Zigbee, or any other wired or wireless protocol.

The memory 300 may store map data 306. The map data 306 may include maps of a given geographical area. The map data 306 may further include a list of transportation infrastructure at specific locations on the maps. For example, the map data 306 may include a location of stop lights, stop signs, intersections, a lane count, road widths, or the like.

In some embodiments, the memory 300 may store a separate list or database of locations and corresponding infrastructure 310. For example, the list may include types of infrastructure at intersections, GPS locations or addresses of traffic signs, or the like. The list (or the maps 306) may further include an identifier of each element of transportation infrastructure. For example, stop lights may be assigned a first identifier, stop signs may be assigned a second identifier, two lane roads may be assigned a third identifier, and so forth. In some embodiments, the identifiers may be more granular than the example previously provided. For example, a first identifier may be assigned to stop lights that have a first light cycle frequency, a second identifier may be assigned to stop lights that have a second light cycle frequency, and a third identifier may be assigned to stop lights that function based on detected vehicles stopped at the intersection.

The memory 300 may further store processor instructions 308. The processor instructions 308 may include instructions usable by the processor 302 to perform functions or algorithms as programmed. For example, the processor instructions 308 may be used by the processor 302 to analyze receive vehicle behavior data.

The memory 300 may also store vehicle behavior data 312. The vehicle behavior data 312 may be an aggregation of the vehicle behavior data that is received by the network access device 304. In some embodiments, the processor 302 may manipulate the vehicle behavior data 312 before causing the memory 300 to store the vehicle behavior data 312. For example, the vehicle behavior data 312 may include an analysis of the vehicle behavior data received by the network access device 304.

The processor 302 may be designed to perform various functions or algorithms such as a location to infrastructure algorithm 314. The vehicle behavior data received by the network access device 304 may include locations associated with the detected vehicle behavior. The location to infrastructure algorithm 314 may compare the received locations to the locations and infrastructure database 310 in the memory 300 to identify one or more specific type of infrastructure at the receive location. For example, if the vehicle behavior data indicated that a driver slammed on brakes at a specific location, the location to infrastructure algorithm 314 may identify that a stop sign (infrastructure) exists at the specific location.

The processor 302 may further perform a vehicle behavior analysis algorithm 316. The vehicle behavior analysis algorithm 316 may analyze the vehicle behavior data received from the network access device 304. For example, the vehicle behavior analysis algorithm 316 may associate certain vehicle behaviors with a certain location (and a corresponding type of infrastructure at the location). As another example, the vehicle behavior analysis algorithm 316 may associate certain vehicle behaviors with a specific type of transportation infrastructure (such as roundabouts).

The processor 302 may also perform an infrastructure improvement algorithm 318. The infrastructure improvement algorithm 318 may utilize the results of the vehicle behavior analysis algorithm 316 to identify improvements to existing infrastructure, or general improvements to infrastructure design. The infrastructure improvements may reduce traffic, increase driver comfort while driving the vehicle, or increase safety. For example, the processor 302 may determine that traffic speeds of greater than 45 miles per hour (mph) at a roundabout increase collisions. The processor 302 may determine that the transportation infrastructure may be improved by reducing a speed limit at a specific roundabout to be less than or equal to 45 mph. The processor 302 may further determine that the transportation infrastructure may be improved by designing new intersections on roads having a speed limit greater than 45 mph to include stop signs or stop lights instead of roundabouts.

In some embodiments, the processor 302 may balance different goals when identifying infrastructure improvements. Continuing the above example, replacing a roundabout with stop lights may decrease traffic speed through the area. The processor 302 may balance the reduction in accidents with the increase in traffic speed to identify whether to recommend replacing a roundabout with a stop light. In some embodiments, the recommended infrastructure improvement may include multiple suggestions including keeping the status quo, and a civil engineer or other professional may analyze the costs and benefits of each infrastructure option (based on the data from the processor 302) and may make a decision based on the costs and benefits.

The processor 302 may further perform a vehicle software update algorithm 320. The vehicle software update algorithm 320 may utilize the results of the vehicle behavior analysis algorithm 316 in order to determine a software update to autonomous or non-autonomous vehicles. For example, the processor 302 may determine that autonomous vehicles generally relinquish control at a specific road curve on a specific highway. The processor 302 may analyze the vehicle behavior data to determine a trigger for this relinquishment of control, may determine a software fix to increase ECU confidence regarding the trigger, and may generate a software update that includes the fix.

As another example, the processor 302 may determine that drivers of autonomous vehicles take control of the vehicles when approaching stop lights on roads having a speed limit of 50 mph or greater. The processor 302 may analyze the vehicle behavior data to determine a potential cause of driver discomfort (e.g., the vehicles may be approaching the stop at a greater speed than the driver is comfortable with). The processor 302 may further generate a software update that increases driver comfort based on the analysis (e.g., the software update may cause the vehicles to begin braking at an earlier point in time in similar situations).

As yet another example, the processor 302 may determine that drivers of non-autonomous vehicles abort lane changes at a relatively high frequency on highways with lanes less than 10 feet wide. The processor 302 may determine a software update, such as improving sensing of adjacent vehicles by the vehicle sensors, that may increase driver comfort while switching lanes in such situations.

The processor 302 may also perform an artificial intelligence algorithm 324. The artificial intelligence algorithm 324 may be performed in some, all, or none of the other algorithms performed by the processor 302. The artificial intelligence algorithm 324 may include a machine learning algorithm and may be trained using previously-detected, received, or otherwise obtained data, based on currently received or detected data, or the like. In some embodiments, the processor may perform another optimization algorithm instead of, or along with, the artificial intelligence algorithm. The artificial intelligence algorithm 324 (or any other optimization algorithm) may, for example, monitor the infrastructure improvements determined by the processor 302 and may improve the infrastructure improvement algorithm 318 to improve the results of the algorithm 318.

The network access device 304 may transmit and/or receive data from vehicles, from remote devices (such as mobile telephones, laptops, or tablets), or the like. For example, the network access device 304 may receive vehicle behavior data 326 from vehicles or other sensors. For example, the vehicle behavior data may correspond to behaviors at least one of detected or performed by a vehicle such as a braking event, an acceleration event, a turning event, a crash, or the like. The vehicle behavior data may also include at least one of a corresponding location or a corresponding piece of infrastructure (e.g., the crash occurred at a stoplight on a 4-lane road).

The network access device 304 may further transmit the vehicle software update 328 that was determined by the vehicle software update algorithm 320. The vehicle software update 328 may be specific to certain types of vehicles (such as a Toyota Prius). In that regard, the vehicle software update 328 may be transmitted only to the certain vehicle types.

The network access device 304 may also transmit infrastructure improvement data 330 to a remote device, such as a third-party server. The infrastructure improvement data 330 may be the infrastructure improvements determined by the infrastructure improvement algorithm 318. The infrastructure improvement data 330 may be transmitted to a government entity for improvement of infrastructure, may be sold to a third-party government entity for use in future infrastructure design, or the like.

Figure 4:
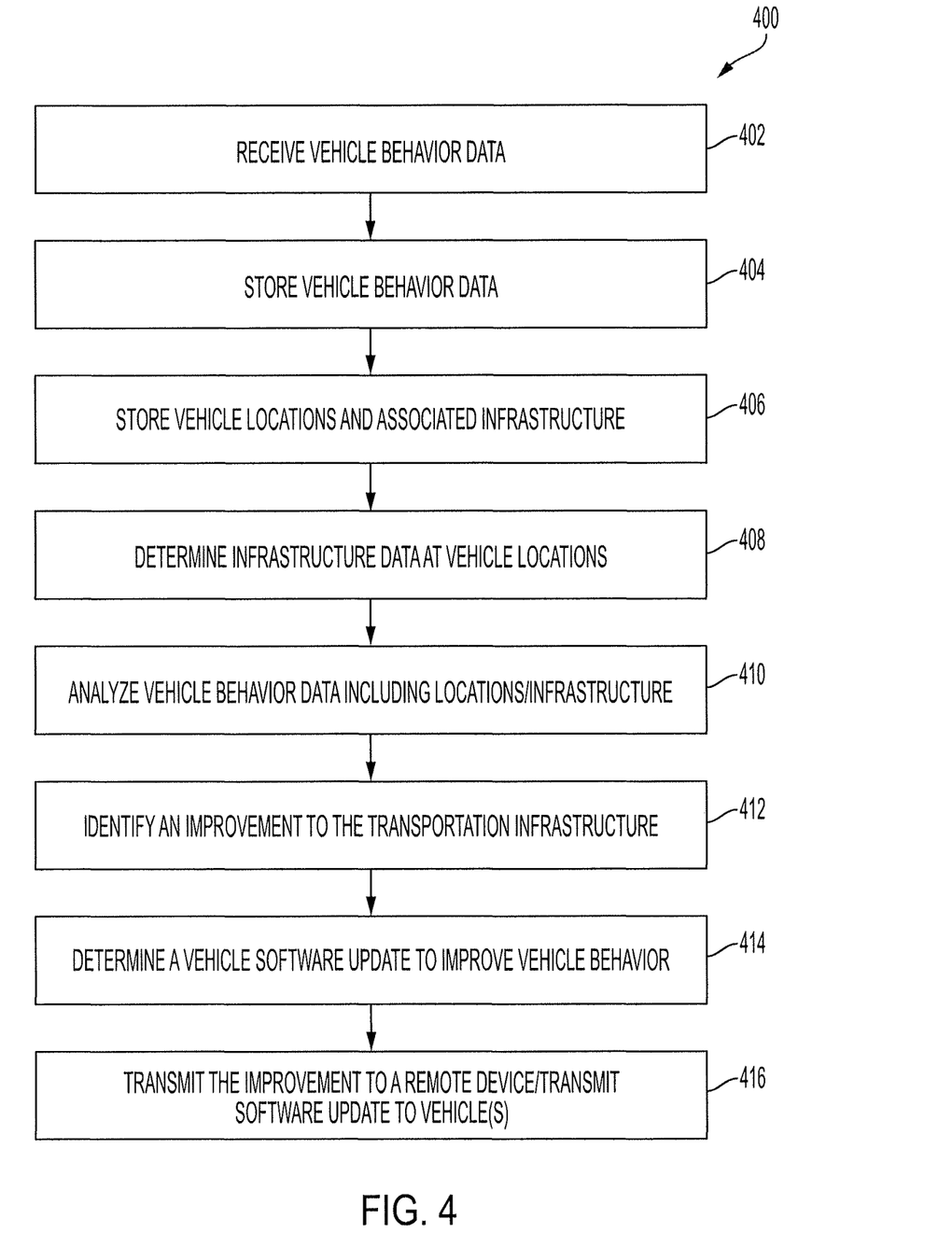
FIG. 4 is a flowchart illustrating a method for identifying improvements to transportation infrastructure according to an embodiment of the present invention.

Referring now to FIG. 4, a method 400 for improving infrastructure and generating a vehicle software update is shown. The method 400 may be performed by a system similar to the system 101 of FIG. 1, including vehicles having similar features as the vehicle 100 and a server having similar features as the server 142.

In block 402, a vehicle may detect vehicle behavior data and may transmit the vehicle behavior data to a server. The vehicle behavior data may include data detected by the vehicle that corresponds to vehicle behavior, may include vehicle control data (as received from a user or determined by an ECU), or the like. The vehicle behavior data may further include a location corresponding to the data, or an identifier of infrastructure at the location at which the data was detected.

The vehicle behavior data may include any vehicle behavior data from a non-autonomous vehicle, a semi-autonomous vehicle, or an autonomous vehicle. In that regard, the vehicle behavior data may correspond to user control of the vehicle, autonomous control of the vehicle, or other actions (such as a wreck caused by another vehicle). The vehicle behavior data may include, for example, braking data. The braking data may correspond to a braking intensity of the vehicle (e.g., an amount of braking force applied by brakes), a braking distance of the vehicle (e.g., for how long the vehicle sustained a braking event), or the like. In some embodiments, the vehicle behavior data may correspond to third-party vehicles. For example, the present vehicle may include a camera that detects image data corresponding to behavior of the third-party vehicle (e.g., the third-party vehicle swerved wide at a turn, or got in an accident at a specific location).

The vehicle behavior data may further include acceleration data. The acceleration data may correspond to an acceleration intensity of the vehicle (e.g., a rate of acceleration, a time or a distance of acceleration, an engine speed, a motor speed, or the like). The vehicle behavior data may also include turning data. The turning data may include a turning angle of the turn, a speed at which the vehicle approached or completed the turn, or the like. The vehicle behavior data may further include accident data. The accident data may correspond to a vehicle accident and may include any type of accident such as a minor collision without damage, a major collision that totals a vehicle, or any other type of collision or accident (e.g., the vehicle running off the road).

The vehicle behavior data may also include autonomous control data. The autonomous control data may correspond to a situation in which an ECU of an autonomous vehicle transfers control of the vehicle from the ECU to a driver. This may occur in a situation in which the ECU lacks sufficient confidence to complete a vehicular maneuver. The autonomous control data may also or instead correspond to a situation in which a driver takes control of the vehicle from an ECU which is operating autonomously. This may occur in a situation in which the driver lacks sufficient confidence to allow the ECU to complete the vehicular maneuver.

The vehicle behavior data may further include autonomous confidence data. The autonomous confidence data may correspond to a confidence level of an ECU to perform a specific vehicular maneuver. For example, an ECU may determine that it is 97 percent (97%) confident in being able to complete a specific turn without running into issues. This confidence level may be sufficiently high that the ECU fails to relinquish control of the vehicle, but may also be sufficiently low that the infrastructure may be improved in order to improve ECU confidence.

In block 404, a memory of a server may store the received vehicle behavior data. As mentioned above, the vehicle behavior data may also include locations associated with the behavior data (which may include identification of infrastructure at the locations). In some embodiments, the processor may analyze and or manipulate the vehicle behavior data prior to causing the vehicle behavior data to be stored in the memory.

In block 406, the memory may also store vehicle locations and associated infrastructure at the vehicle locations. The vehicle locations may include any locations which may be detected or traveled along by vehicles. For example, the memory may be preloaded with the locations and infrastructure. As another example, the vehicles (such as cameras or other sensors) may detect the infrastructure as the vehicles are traveling and may transmit the infrastructure and associated locations to the server for storage in the memory. As another example, the server may access a remote database (such as a government server) to identify infrastructure at specific locations.

The transportation infrastructure may include any infrastructure associated with transportation. For example, the transportation infrastructure may include a lane width at a specific location, a quantity of lanes on a specific road stretch, presence of one or more roundabout, or the like. The transportation infrastructure may also include features such as a presence of a bridge, a clearance below the bridge, a presence of a tunnel, a clearance through the tunnel, a width of the tunnel, a presence of an overpass, or a presence of an underpass.

The transportation and superstructure may further include a highway on-ramp (including a turning radius of the on-ramp, a length of the on-ramp, a speed limit at the beginning and end of the on-ramp, or the like) or a highway off-ramp (including a turning radius of the off-ramp, a length of the off-ramp, a speed limit at the beginning and end of the off-ramp, or the like). The transportation infrastructure may further include a presence of a school zone (as well as the hours corresponding to a reduced speed in the school zone), a lane marker (including a color, thickness, intensity, or the like of the lane marker), an intersection (including a quantity of lanes entering the intersection), or a turn (including a turning radius, a speed limit, or the like at the turn). The transportation infrastructure may also include a presence of a railroad crossing (potentially including times at which trains travel by or whether a train was crossing by at the time of the vehicle behavior data).

The transportation infrastructure may correspond to additional features such as a presence of a stop light or stop sign (including a cycle timing of the stoplight, or the like) or a presence of a yield sign (including whether the yield sign was obeyed). The transportation infrastructure may also include a speed limit, an animal crossing sign, or a presence of (and identification of) a point of interest.

In block 408, the server may determine infrastructure data at the specific vehicle locations included in the vehicle behavior data. For example, the processor may compare the specific vehicle locations to the memory in order to identify one or more type of infrastructure at the specific vehicle locations. As another example, the vehicle behavior data may include image data that the server can analyze to identify the infrastructure at the specific location where the behavior data was detected. For example, if the behavior data included acceleration data and associated image data, the server may determine that the acceleration event occurred at a stop light based on the associated image data.

In some embodiments, the server may transmit the specific vehicle location to a remote server (such as a third-party government server) along with a query regarding the infrastructure at the location. The third-party server may transmit a response with the specific infrastructure.

The third-party server (or the server) may also determine additional applicable infrastructure data based on data detected by the vehicle or data associated with the vehicle location. For example, the image data may indicate which lane of a four-lane highway the vehicle was traveling on, and the server may identify the lane based on the image data. As another example, the vehicle location may have a relatively high accuracy. In that regard, the server may identify a lane which the vehicle is occupying, whether the vehicle was in front of or behind a traffic line (such as at a stoplight), or the like based on the vehicle location.

In block 410, the processor of the server may analyze the vehicle behavior data received from the vehicles. The analysis may be based on the detected data, the location at which the data was detected, and the corresponding infrastructure at the location. The processor may analyze the vehicle behavior data to determine trends in the data which may be associated with infrastructure or vehicle control/logic that can be improved. The processor may receive a relatively large amount of data and may determine the trends based on the large amounts of data. In some embodiments, the processor may use an artificial intelligence algorithm to determine the trends and to further improve the analysis algorithm. The artificial intelligence algorithm may be trained based on historical data, presence data, or a combination of both.

For example, the server may identify a trend that many drivers depress brakes when making a specific turn and that multiple accidents have occurred at the specific turn. As another example, the server may identify a trend that speed limits below 20 mph are rarely followed, and that fewer accidents occur on roads with similar features that have speed limits greater than 25 mph.

In block 412, the processor may identify an improvement to the transportation infrastructure based on the analysis from block 410. The processor may review the trends associated with the specific vehicle locations and determine infrastructure improvements which may reduce traffic, increase driver comfort, or increase safety. In some embodiments, the processor may perform a simulation of the infrastructure based on the vehicle behavior data and may attempt to make changes to the infrastructure in the simulation to determine if results can be improved. In some embodiments, the processor may compare infrastructure at similar locations (e.g., a four-way intersection in a city region) to identify which types of infrastructure provide the greatest results (e.g., use of a stop sign, a four-way stop, a traffic light, or the like).

In block 414, the processor may determine a vehicle software update to improve vehicle behavior at a specific type of infrastructure based on the analysis of the vehicle behavior data. The vehicle software update may be applicable to autonomous vehicles, non-autonomous vehicles, or both. The vehicle software update may correspond to vehicle behavior in response to specific stimuli (such as infrastructure stimuli). For example, the vehicle software update may correspond to a change in vehicle control at a stop sign or stop light. As another example, the vehicle software update may correspond to a change in display of information within the vehicle (such as changing the way an object detected on either side of the vehicle is conveyed to a driver).

In block 416, the server may transmit the improvements determined in block 412 to a remote device, such as a government server or database. The server may also or instead transmit the software update to applicable vehicles. In some embodiments, the software update may be required to be reviewed by a human supervisor prior to being transmitted to the applicable vehicles.

The improvements may be sent to any of a number of agencies or entities. For example, the improvements may be sold to a government to be used to improve infrastructure in designing a new city. The improvements may also be sent to a design firm or government to be used to install new or replacement infrastructure in a given area.

Where used throughout the specification and the claims, "at least one of A or B" includes "A" only, "B" only, or "A and B." Exemplary embodiments of the methods/systems have been disclosed in an illustrative style. Accordingly, the terminology employed throughout should be read in a non-limiting manner. Although minor modifications to the teachings herein will occur to those well versed in the art, it shall be understood that what is intended to be circumscribed within the scope of the patent warranted hereon are all such embodiments that reasonably fall within the scope of the advancement to the art hereby contributed, and that that scope shall not be restricted, except in light of the appended claims and their equivalents.

What is claimed is:

1. A system for improving transportation infrastructure to at least one of reduce traffic, increase driver comfort, or increase safety, the system comprising:
a network access device configured to receive vehicle behavior data from multiple vehicles, the vehicle behavior data including at least one of driver-controlled vehicle behavior or autonomous vehicle behavior at a plurality of vehicle locations;
a memory configured to store the vehicle behavior data; and
a processor coupled to the network access device and the memory and configured to:
perform an analysis of the vehicle behavior data,
identify, based on the analysis, an improvement to the transportation infrastructure,
generate, based on the analysis, a vehicle software update related to a change in vehicle control responsive to the transportation infrastructure, and
transmit, by the network access device, the vehicle software update to one or more vehicles of the multiple vehicles, the vehicle software update configured to enable an electronic control unit (ECU) on a respective vehicle of the one or more vehicles to control the respective vehicle.

2. The system of claim 1, wherein the memory is further configured to store information corresponding to one or more vehicle locations and associated infrastructure data at the one or more vehicle locations, and the processor is further configured to determine infrastructure data at the plurality of vehicle locations by comparing the plurality of vehicle locations to the one or more vehicle locations and the associated infrastructure data stored in the memory when the network access device receives the plurality of vehicle locations.

3. The system of claim 1, wherein the vehicle behavior data includes at least one of braking data corresponding to at least one of a braking intensity or a braking distance, acceleration data corresponding to an acceleration intensity, turning data corresponding to a turn angle of a turn, accident data corresponding to a vehicle accident, autonomous control data corresponding to at least one of an autonomous vehicle initiating a handoff from autonomous control to driver control or a driver initiating the handoff from the autonomous control to the driver control, or autonomous confidence data corresponding to a confidence level of an autonomously-controlled action as determined by an ECU on one of the multiple vehicles.

4. The system of claim 1, wherein the processor is further configured to identify infrastructure features that optimize at least one of the traffic, the driver comfort, or the safety such that the identified infrastructure features can be implemented in new transportation infrastructure to optimize the new transportation infrastructure.

5. The system of claim 1, wherein the processor is further configured to perform an analysis of the vehicle behavior data at different locations that have one or more common infrastructure features to determine trends associated with the one or more common infrastructure features, and to identify the improvement to the transportation infrastructure based on the analysis of the vehicle behavior data at the different locations.

6. The system of claim 1, wherein the change in vehicle control includes a change in vehicle control of an autonomous vehicle behavior responsive to the transportation infrastructure, and the network access device is further configured to transmit the vehicle software update to at least one autonomous vehicle of the multiple vehicles.

7. The system of claim 6, wherein the vehicle software update is configured to cause an ECU on the at least one autonomous vehicle to initiate a handoff from autonomous control to driver control when the transportation infrastructure is encountered in order to increase driving safety.

8. The system of claim 1, wherein the processor is further configured to transmit, by the network access device, data including or related to the identified improvement to the transportation infrastructure to a remote device associated with a third-party government entity which utilizes the data including or related to the identified improvement to the transportation infrastructure for improving infrastructure design.

9. A method for improving transportation infrastructure to at least one of reduce traffic, increase driver comfort, or increase safety, the method comprising:
receiving, by a network access device, vehicle behavior data from multiple vehicles, the vehicle behavior data including at least one of driver-controlled vehicle behavior or autonomous vehicle behavior at a plurality of vehicle locations;
storing, in a memory, the vehicle behavior data;
performing, by a processor, an analysis of the vehicle behavior data;
identifying, by the processor and based on the analysis, an improvement to the transportation infrastructure;
generating, by the processor and based on the analysis, a vehicle software update related to a change in vehicle control responsive to the transportation infrastructure; and
transmitting, by the network access device, the vehicle software update to one or more vehicles of the multiple vehicles, the vehicle software update configured to enable an electronic control unit (ECU) on a respective vehicle of the one or more vehicles to control the respective vehicle.

10. The method of claim 9, further comprising:
storing, in the memory, information corresponding to one or more vehicle locations and associated infrastructure data at the one or more vehicle locations; and
determining, by the processor, infrastructure data at the plurality of vehicle locations by comparing the plurality of vehicle locations to the one or more vehicle locations and the associated infrastructure data stored in the memory when the network access device receives the plurality of vehicle locations.

11. The method of claim 9, wherein the vehicle behavior data includes at least one of braking data corresponding to at least one of a braking intensity or a braking distance, acceleration data corresponding to an acceleration intensity, turning data corresponding to a turn angle of a turn, accident data corresponding to a vehicle accident, autonomous control data corresponding to at least one of an autonomous vehicle initiating a handoff from autonomous control to driver control or a driver initiating the handoff from the autonomous control to the driver control, or autonomous confidence data corresponding to a confidence level of an autonomously-controlled action as determined by an ECU on one of the multiple vehicles.

12. The method of claim 9, further comprising identifying, by the processor, infrastructure features that optimize at least one of the traffic, the driver comfort, or the safety such that the identified infrastructure features can be implemented in new transportation infrastructure to optimize the new transportation infrastructure.

13. The method of claim 9, further comprising performing, by the processor, an analysis of the vehicle behavior data at different locations that have one or more common infrastructure features to determine trends associated with the one or more common infrastructure features, wherein identifying the improvement to the transportation infrastructure is further based on the analysis of the vehicle behavior data at the different locations.

14. The method of claim 9, wherein the transportation infrastructure includes at least one of a lane width, a quantity of lanes, a roundabout, a bridge, a tunnel, an overpass, an underpass, an on-ramp, an off-ramp, a railroad crossing, a school zone, a lane marker, a road curve, an intersection, a turn, a stop light, a stop sign, a yield sign, a speed limit, an animal crossing sign, or a point of interest.

15. The method of claim 9,
wherein the change in vehicle control includes a change in vehicle control of an autonomous vehicle behavior responsive to the transportation infrastructure, and the method further comprises:
transmitting, by the network access device, the vehicle software update to at least one autonomous vehicle of the multiple vehicles.

16. The method of claim 15, wherein the vehicle software update is configured to cause an ECU on the at least one autonomous vehicle to initiate a handoff from autonomous control to driver control when the transportation infrastructure is encountered in order to increase driving safety.

17. A method for improving transportation infrastructure to at least one of reduce traffic, increase driver comfort, or increase safety for autonomous vehicles, the method comprising:

receiving, by a network access device, autonomous vehicle behavior data from multiple vehicles, the autonomous vehicle behavior data associated with a plurality of vehicle locations, the autonomous vehicle behavior data including at least one of an autonomous vehicle initiating a handoff from autonomous control to driver control or a driver initiating the handoff from the autonomous control to the driver control, or autonomous confidence data corresponding to a confidence level of an autonomously-controlled action as determined by an electronic control unit (ECU) on one of the multiple vehicles;

storing, in a memory, the autonomous vehicle behavior data;

performing, by a processor, an analysis of the autonomous vehicle behavior data;

identifying, by the processor and based on the analysis, an improvement to at least one of the transportation infrastructure or at least one of the multiple vehicles;

generating, by the processor and based on the analysis, a vehicle software update related to a change in vehicle control responsive to the transportation infrastructure; and transmitting, by the network access device, the vehicle software update to the at least one of the multiple vehicles, the vehicle software update configured to enable an ECU on a respective vehicle of the at least one of the multiple vehicles to control the respective vehicle.

18. The method of claim 17, further comprising:

determining, by the processor, the vehicle software update to improve autonomous vehicle behavior at the transportation infrastructure based on the improvement to the at least one of the multiple vehicles.

19. The method of claim 18, wherein the vehicle software update is configured to cause the ECU on the respective vehicle to initiate the handoff from the autonomous control to the driver control when the transportation infrastructure is encountered in order to increase driving safety.

20. The method of claim 17, further comprising performing, by the processor, an analysis of the autonomous vehicle behavior data at different locations that have one or more common infrastructure features to determine trends associated with the one or more common infrastructure features, wherein identifying the improvement to the transportation infrastructure is further based on the analysis of the autonomous vehicle behavior data at the different locations.

* * * * *